(12) United States Patent
Bierkoch et al.

(10) Patent No.: US 10,001,150 B2
(45) Date of Patent: Jun. 19, 2018

(54) SCREEN FOR HYDRAULIC VALVE AND HYDRAULIC VALVE

(71) Applicant: Hilite Germany GmbH, Marktheidenfeld (DE)

(72) Inventors: Michael Bierkoch, Nuertingen (DE); Thomas Jacob, Stuttgart (DE); Juergen Peiler, Oberboihingen (DE)

(73) Assignee: Hilite Germany GmbH, Marktheidenfeld (DE)

( * ) Notice: Subject to any disclaimer, the term of this patent is extended or adjusted under 35 U.S.C. 154(b) by 0 days. days.

(21) Appl. No.: 15/180,277

(22) Filed: Jun. 13, 2016

(65) Prior Publication Data
US 2017/0009786 A1    Jan. 12, 2017

(30) Foreign Application Priority Data
Jul. 10, 2015   (DE) .......................... 10 2015 111 221

(51) Int. Cl.
| F15B 21/04 | (2006.01) |
| F16K 27/04 | (2006.01) |
| F01L 1/344 | (2006.01) |

(52) U.S. Cl.
CPC ............ *F15B 21/041* (2013.01); *F01L 1/344* (2013.01); *F16K 27/041* (2013.01); *F16K 27/048* (2013.01); *B01D 2201/184* (2013.01); *F01L 2001/3443* (2013.01); *F01L 2001/3444* (2013.01)

(58) Field of Classification Search
CPC ...... F15B 21/041; F01L 1/344; F16K 27/041; F16K 27/048; Y10T 137/8259
See application file for complete search history.

(56) References Cited

U.S. PATENT DOCUMENTS

| 4,969,999 | A | * | 11/1990 | Riddell | ................. | B01D 29/111 |
| | | | | | | 156/157 |
| 5,064,537 | A | * | 11/1991 | Chupka | ................. | B01D 29/111 |
| | | | | | | 162/251 |
| 5,482,622 | A | * | 1/1996 | Stark | ..................... | B01D 29/111 |
| | | | | | | 156/245 |
| 5,587,077 | A | * | 12/1996 | Aaltonen | ............. | B01D 29/012 |
| | | | | | | 210/498 |
| 6,138,838 | A | * | 10/2000 | Soik | ........................ | D21D 5/16 |
| | | | | | | 209/306 |
| 6,398,830 | B1 | * | 6/2002 | Rhodes | .................. | B01D 46/10 |
| | | | | | | 55/385.1 |
| 8,186,378 | B2 | * | 5/2012 | Nordstrom | .......... | F16K 31/0613 |
| | | | | | | 137/550 |
| 8,656,948 | B2 | * | 2/2014 | Stephens | ................. | F01L 1/344 |
| | | | | | | 137/545 |

(Continued)

FOREIGN PATENT DOCUMENTS

| CN | 103402701 | 11/2013 |
| CN | 103619760 A | 3/2014 |

(Continued)

*Primary Examiner* — Craig Schneider
*Assistant Examiner* — Kevin Barss
(74) *Attorney, Agent, or Firm* — Von Rohrscheldt Patents (57) ABSTRACT

The invention relates to a screen for a hydraulic valve including a band plate with screen openings wherein the screen openings form etched functional contours. The invention also relates to a hydraulic valve with the screen.

10 Claims, 7 Drawing Sheets

(56) References Cited

U.S. PATENT DOCUMENTS

| | | | |
|---|---|---|---|
| 8,931,449 B2* | 1/2015 | Kinscher | B01D 29/112 123/90.17 |
| 8,978,697 B2* | 3/2015 | Hoppe | B01D 29/014 137/550 |
| 2004/0182450 A1 | 9/2004 | Maeda et al. | |
| 2005/0011703 A1* | 1/2005 | Yamaguchi | F01L 1/344 184/6.9 |
| 2008/0035554 A1 | 2/2008 | Tashiro | |
| 2008/0072975 A1* | 3/2008 | Sugiura | G05D 16/2013 137/544 |
| 2010/0243085 A1* | 9/2010 | Van Weelden | F15B 13/0402 137/544 |
| 2012/0241369 A1* | 9/2012 | McLane | B01D 29/07 210/301 |
| 2013/0061959 A1 | 3/2013 | Stephens | |
| 2015/0129059 A1 | 5/2015 | Okada et al. | |

FOREIGN PATENT DOCUMENTS

| | | |
|---|---|---|
| CN | 104633177 A | 3/2014 |
| DE | 10200705447 A1 | 9/2004 |
| DE | 102007050447 A1 | 4/2009 |
| DE | 102013217984 | 5/2014 |
| FR | 2843426 A1 | 2/2004 |
| JP | 2006022816 A | 1/2006 |
| WO | WO9108338 A1 | 6/1991 |
| WO | WO9307334 A1 | 4/1993 |
| WO | WO2012116758 | 9/2012 |

\* cited by examiner

SCREEN FOR HYDRAULIC VALVE AND HYDRAULIC VALVE

RELATED APPLICATIONS

This application claims priority from and incorporates by reference German Patent Application DE10 2015 111 221.3 filed on Jul. 10, 2015.

FIELD OF THE INVENTION

The invention relates to a screen to a screen for a hydraulic valve and to a hydraulic valve.

BACKGROUND OF THE INVENTION

In order to assure functionality of hydraulic valves for example in mechatronic transmission controls it is necessary as a matter of principle to keep contaminations away from the valve in order to assure the valve function. Due to small operating gaps and operating clearances in particular large particles can lead to an impairment of the valve function or to a failure through blockage. This can be prevented successfully through a coarse contaminant filter accordingly integrated in the valve.

Thus, different screens are being used. Mostly radially enveloping clip or band screens are used in different embodiments. Clip screens as known for example from DE 10 2007 050 447A1 are used with a wire mesh that is enveloped by injection molding.

In particular the molded in wire mesh can be damaged under high volume flows which impact the wire mesh with a respective speed or under a respective pressure.

BRIEF SUMMARY OF THE INVENTION

Thus, it is an object of the invention to provide a screen and a hydraulic valve with the screen which has a high level of robustness with respect to pressure pulsations and pressure spikes in hydraulic systems.

The object is achieved by a screen for a hydraulic valve, the screen including a band plate with screen openings, wherein the screen openings are provided as etched functional contours.

The screen according to the invention for a hydraulic valve includes a sheet metal band with screen openings wherein the screen openings form etched functional contours. The manufacturing method of etching facilitates producing and optimizing geometries of the screen opening according to special functional requirements of the respective hydraulic valve. The etched screen has a high level of robustness. Furthermore variable hydraulic functional contours can be provided in different sheet metal thicknesses in a simple and reproducible manner. Additionally the functional geometries can be adapted to each other through simple computation and simulation methods.

Advantageously the screen openings are formed by one sided or two sided etching of the sheet metal band. In particular two sided etching increases variability of the functional contours.

According to an advantageously embodiment the screen openings are configured as apertures. The aperture function facilitates a temperature independent and controlled pressure drop when flowing through the screen.

An advantageous embodiment of the invention provides that the screen openings are provided spherical segment shaped on one side or on both sides wherein a smallest diameter of the screen openings forms an aperture diameter.

Thus, the screen openings can be advantageously configured circular segment shaped on both sides and an axial position of the aperture can be variable.

The screen openings can be further advantageously configured as a contaminant barrier i. This is provided in particular in that the spherical segments are configured in different sizes so that the aperture is not arranged in a center of the sheet metal band.

When the screen openings are configured as spherical segments on both sides and center axes of the spherical segments are provided offset to each other a controlled flow conduction in addition to the aperture effect can be provided for example in order to prevent dynamic pressures in order to provide a controlled approaching flow of functional surfaces of other components etc.

A simple and cost effective configuration can be obtained in that the sheet metal band is provided as a band screen. Thus, ends of the band screen can be advantageously provided welded together.

Alternatively the sheet metal band can be arranged in a carrier frame. The carrier frame can be used as a clip in this case The screen according to the invention is used in a hydraulic valve which can be used for example as a transmission valve or as a control valve for a cam phaser.

Advantageous embodiments and advantages of the invention can be derived from the additional patent claims, the description and the drawing.

BRIEF DESCRIPTION OF THE DRAWINGS

Additional advantages can be derived from the subsequent drawing description. The drawing figures illustrate embodiment of the invention. The drawing figures, the description and the claims include numerous features in combination. A person skilled in the art will view the features also individually and will combine them into useful additional combinations.

DETAILED DESCRIPTION OF THE INVENTION

In the figures like or identical components are designated with identical reference numerals. The figures only illustrate embodiments and they do not limit the scope and spirit of the invention.

Figure 12:
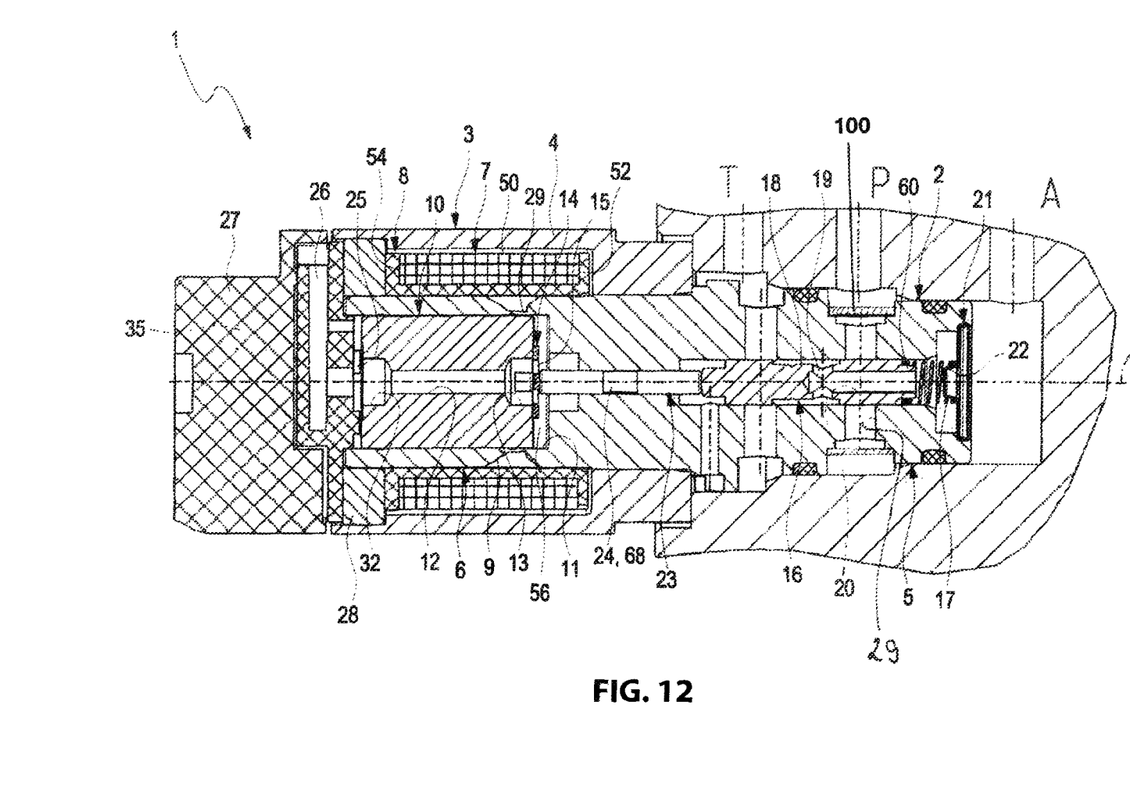
FIG. 12 illustrates the hydraulic valve with a screen according to the invention.

FIG. 12 illustrates an exemplary application of a screen 100 according to the invention which will be subsequently be described in more detail in a hydraulic valve 1 which can be used as a transmission valve of a mechatronic transmission control.

The hydraulic valve 1 that is illustrated in FIG. 12 in a longitudinal sectional view is used for example in a dual clutch transmission. Thus, valve bushings 5 of hydraulic portions 2 of plural hydraulic valves that have similar configurations are inserted into a control plate of the dual clutch transmission. The valve bushings 5 are configured as turned components. Electro magnet portions 3 of the transmission valve 1 which are respectively connected with the hydraulic portions 2 protrude from the control plate and are flowed by hydraulic fluid. Each of the electromagnet portions 3 includes a magnetizable housing 4.

The hydraulic valve 1 includes an electromagnet component 3 with the magnetizable housing 4 which envelops a magnet coil 7 at an outer circumference 50 and at least at a first face 52 and a pole tube 6 that is arranged in an interior of the magnet coil 7 wherein an armature 10 is provided axially moveable in an armature cavity 56. Furthermore the hydraulic valve 1 includes the hydraulic portion 2 with a hydraulic piston 16 which is supported axially moveable in the valve bushing 5 and which facilitates connecting at least one operating connection A optionally with a supply connection P and a tank drain T. The armature 10 is provided for driving the hydraulic piston 16. The valve bushing 5 is arranged along a longitudinal axis L in an imaginary extension of the pole tube 6. The magnet coil 7 is embedded in a coil element 6 and received in the housing 4 for example by a press fit. Alternatively a magnet coil 7 can also be encased by the plastic material of the coil element 3 through injection molding.

As evident from FIG. 12 the valve bushing 5 is provided integral in one piece together with the pole tube 6 so that the hydraulic valve 1 includes less components and the assembly process can be simplified. The coaxial arrangement of pole tube 6 and valve bushing 5 facilitates a configuration with a large penetration depth of the armature 10 in the magnet coil 7 of the electromagnet portion 3 which facilitates an advantageous effective operation of the hydraulic valve 1. This improves the overall function of the entire hydraulic valve 1.

The advantageous embodiment of the coaxial arrangement of the pole tube 6 and the valve bushing 5 further facilitates a reduction of the magnetic transversal forces upon the armature 10 since a precise alignment of the armature path in the axis of the magnet coil 7 can be established in a simpler manner by a one piece embodiment of the pole tube 6 and the valve bushing 5.

In order to favorably influence the magnetic flux the pole tube 6 includes for example a V-shaped recess 9.

The armature 10 is provided axially moveable in a recess 11 of the pole tube 6 forming an armature cavity 56 and includes a central channel 12 which is configured as a bore hole. The central channel 12 is expanded to a recess 13 with a larger diameter with a boss at the front end of the armature 10 wherein the recess is also configured as a bore hole. An anti-stick disc 14 is inserted into this larger recess 13 wherein the anti-stick disc includes one or plural small throttle aperture openings 15 that are arranged eccentrical relative to the longitudinal axis L, wherein the throttle aperture openings connect the armature cavity with the central channel 12. The anti-stick disc 14 prevents a sticking of the armature 10 at the magnetically conductive valve bushing 5 of the hydraulic portion 2 when the armature 10 is fully extended.

The hydraulic portion 2 includes the hydraulic piston 16 which is supported axially moveable in the valve bushing 5. The hydraulic piston 16 is supported by a spring element 17 at an end 60 that is oriented away from the armature 10, wherein the spring element is supported at the valve bushing 5. Thus, the hydraulic piston 16 is movable against a force of the spring element 17 configured as a compression coil spring wherein the spring element 17 is supported at a screen 21 that is attached in the valve bushing 5. In order to support and center the compression coil spring 17 the screen 21 includes a spring guide 22. As a function of a position of the hydraulic piston 16 the operating connection A is connectable by a circumferential annular groove 18 and by longitudinal and transversal bore holes 20, 19 in the hydraulic piston 16 with the supply connection P or the tank connection T.

When the hydraulic piston 16 is in the illustrated starting position since no sufficient voltage is applied to the magnet coil 7 the hydraulic fluid is run from the operating connection A to the tank drain T.

The axial force transmission between the armature 10 and the hydraulic piston 16 is provided by a pin 23 which is supported in the valve bushing 5. The pin 23 facilitates a decoupling between an armature support and a piston support. A circumferential recess 24 at a circumference of the pin which is provided as a circumferential annular groove 68 thus facilitates a reduction of the contact surface which helps to reduce friction. Simultaneously advantageously only axial forces are transmitted by the pin 23 and the tolerance situation is also improved significantly. In order to provide low friction force transmission the hydraulic piston 16 and the anti-stick disk 14 include spherical protrusions. In order to simplify both components it is alternatively conceivable to provide a contact surface reducing structure, advantageously rounded faces, in particular spherical protrusions at the pin 23.

As can be further derived from FIG. 12 a pole disc 28 is provided integrated into the coil element 8 wherein the pole disc is for example at least partially encased by the plastic material of the coil element 8 or in that recesses of the pole disc 28 are filled by injection molding This helps to achieve a reduced axial installation space and assembly of the hydraulic valve 1 is simplified. The pole disc 28 is used as a magnetizable termination for the magnetizable housing 4 which envelops the magnet coil 7 at the outer circumference 50 and at least at one face 52 at a face 54 of the magnet coil 7 which is oriented away from hydraulic piston 16. The pole disc 28 can be provided as a magnetizable element that is for example disc shaped or ring shaped and provided with recesses for cable pass through openings wherein the recesses can be for example bore holes.

The coil element 8 closes the armature cavity 56 at one end of the hydraulic valve 1. Thus, protrusions 25 protruding into the armature cavity 56 form a stop for the armature 10 so that the reduced contact surface has an anti-stick effect.

A hydraulic fluid reservoir 26 that is provided in the coil element 8 which is advantageously initially filled once is connected with the armature cavity 56 and prevents an air entry into the hydraulic valve 1. Furthermore the option to move the hydraulic fluid into the reservoir 26 prevents additional undesirable dampening.

The reservoir 26 is sized so that the volume transfer generated by the pin stroke is significantly less than the reservoir volume. This reduces a contaminant introduction into the armature cavity 56.

In order to prevent a short caused by contaminants between a non illustrated fork plug 35 and the pole disc 28 the hydraulic valve 1 furthermore includes a chip protection cover 27 which covers the pole disc 28 with ribs. The fork plug 35 is also provided partially encased through injection molding in the plug element 8, so that a safe attachment of the fork plug 35 and thus also a safe contacting can be provided.

The screen 100 covers one or plural radial P openings 29 so that contaminant introduction into the hydraulic valve 1 from a direction of the supply connection P can be safely prevented.

FIGS. 1-10 include details of five embodiments of the screen 100 according to the invention for a hydraulic valve. The screen 100, respectively includes a band plate 101 with plural screen openings 102 which from etched function contours. The screen openings 102 can thus be formed by one sided or two sided etching of the band plate 101.

Contrary to known screens the etching method facilitates fabricating and optimizing the geometry of the screen openings 102 in the band plate 101 according to the special functional requirements of the respective hydraulic valves in a controlled manner. Thus, the screen 100 is provided with a high level of robustness with respect to pressure pulses and pressure spikes of the hydraulic systems.

The screen openings 102 are advantageously configured as apertures so that a temperature independent and controlled pressure drop can be obtained when the screen 100 is flowed through.

As can be derived from the embodiments the screen openings 102 are spherical segment shaped on one side or on both sides and are provided with a first and a second spherical segment 104, 105 wherein the smallest diameter of the screen openings 102 forms an aperture diameter 103, wherein an axial position of the aperture is variable.

When the aperture is not arranged in a center of the band plate 101 the first spherical segment 104 is configured larger than the second spherical segment 105. In this case the second spherical segment 105 of the screen opening 102 functions as a contaminant barrier The same applies also for the embodiment according to FIGS. 5 and 6 in which the screen openings 102 are respectively only formed by a spherical segment 104.

Figure 1:
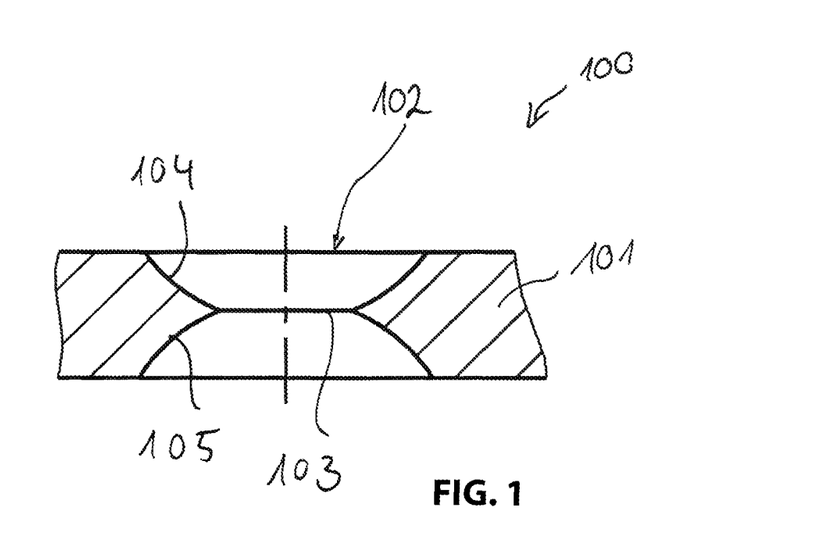
FIG. 1 illustrates a detail of a screen according to the invention in a longitudinal sectional view.
Figure 2:
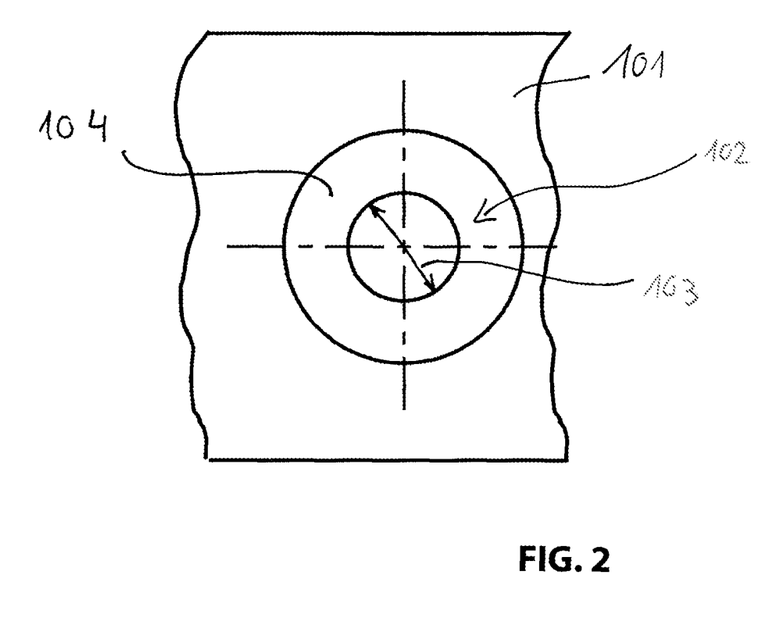
FIG. 2 illustrates a top view of the detail according to FIG. 1.
Figure 3:
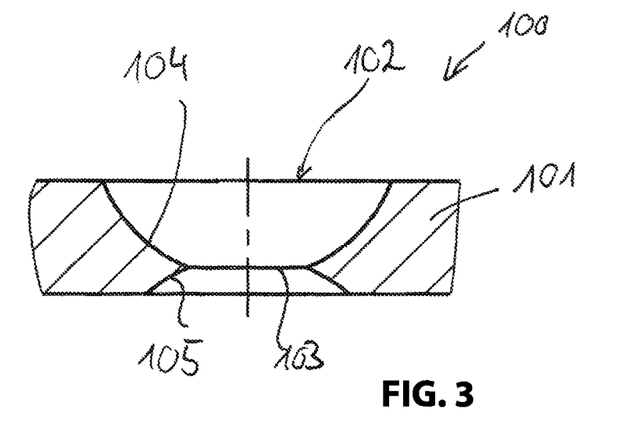
FIG. 3 illustrates a detail of a second embodiment of a screen according to the invention in a longitudinal sectional view.
Figure 4:
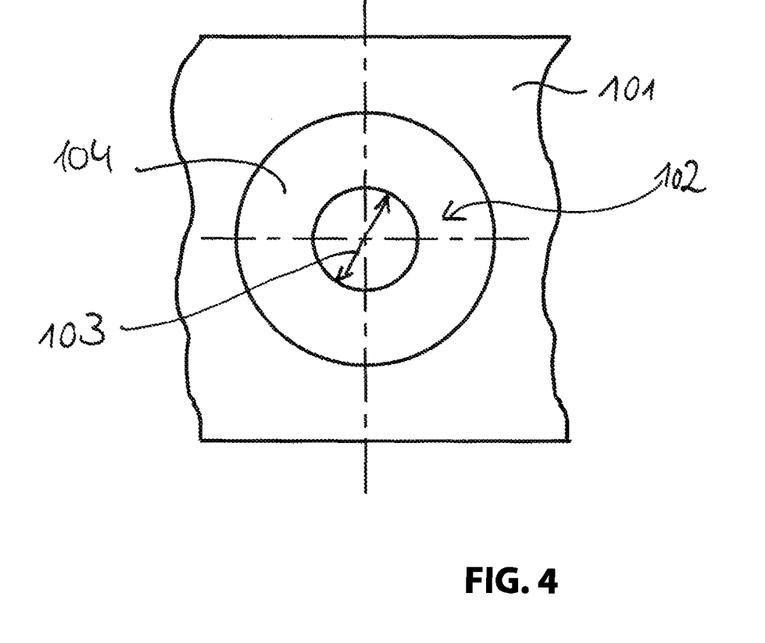
FIG. 4 illustrates a top view of the detail according to FIG. 3.
Figure 5:
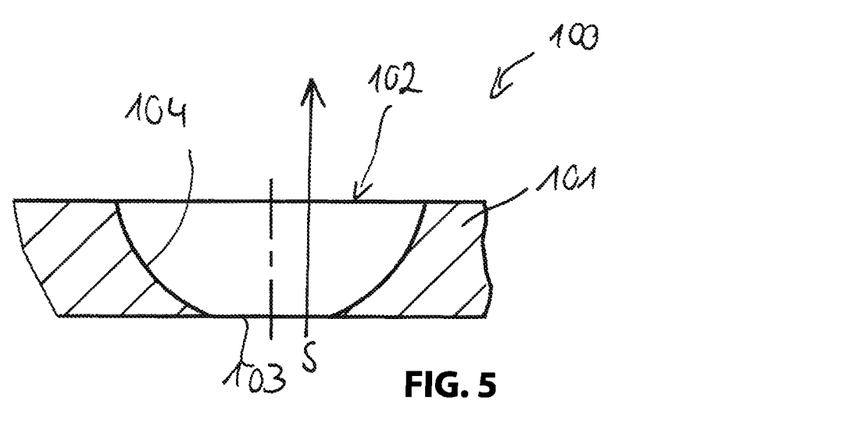
FIG. 5 illustrates a detail of a third embodiment of a screen according to the invention in a longitudinal sectional view.
Figure 6:
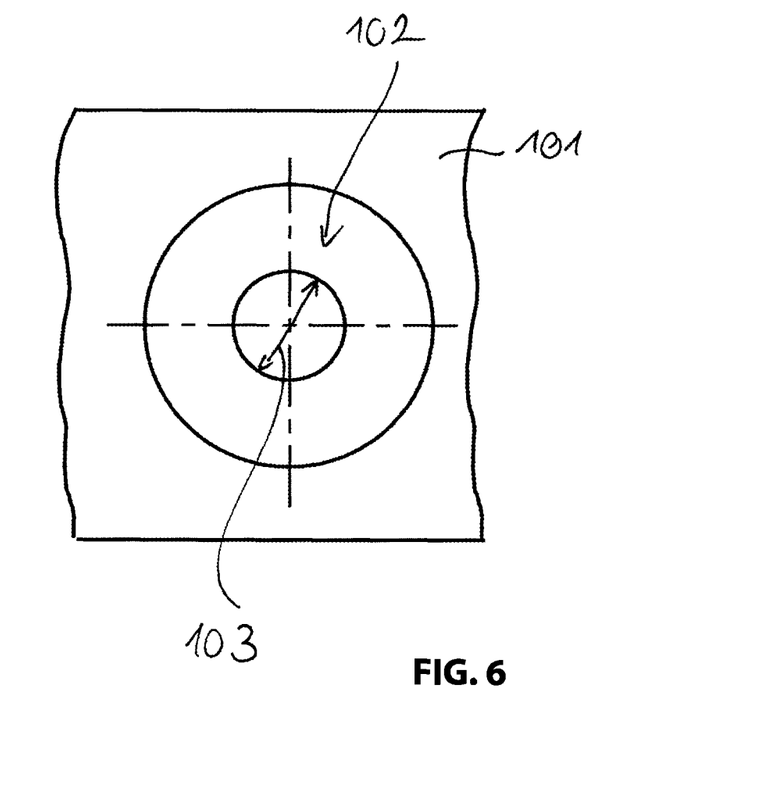
FIG. 6 illustrates a top view of the detail according to FIG. 5.
Figure 7:
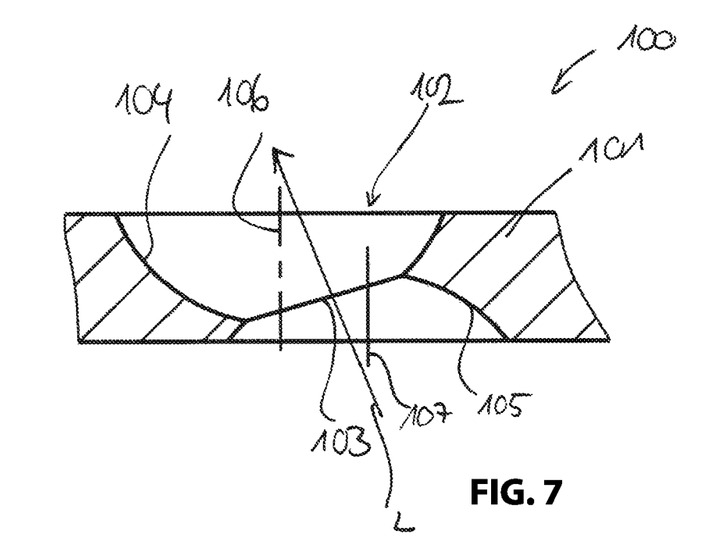
FIG. 7 illustrates a detail of a fourth embodiment of a screen according to the invention in a longitudinal sectional view.
Figure 8:
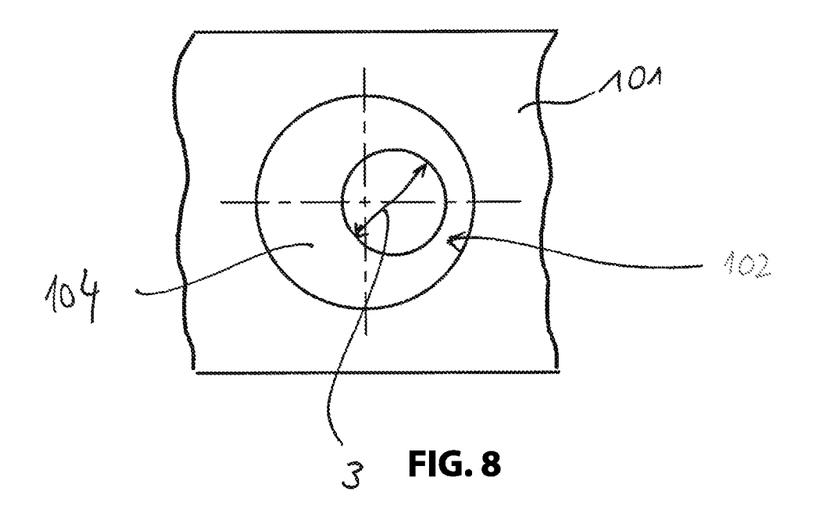
FIG. 8 illustrates a top view of the detail according to FIG. 7.
Figure 9:
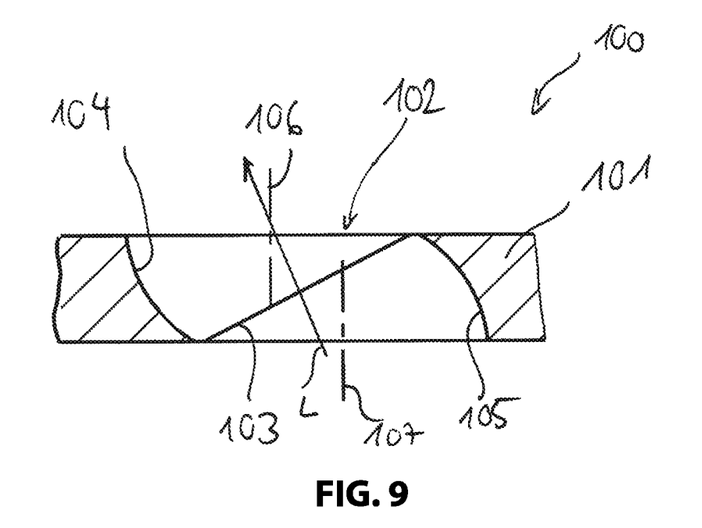
FIG. 9 illustrates a detail of a fifth embodiment of a screen according to the invention in a longitudinal sectional view.
Figure 10:
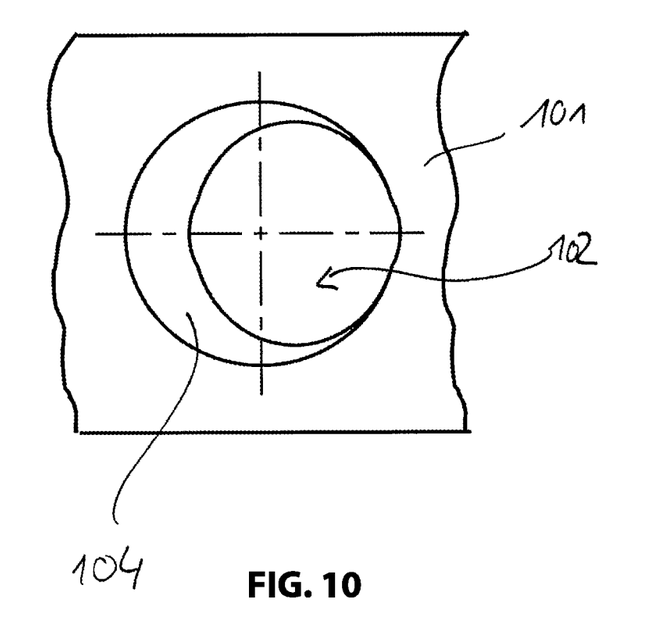
FIG. 10 illustrates a top view of the detail according to FIG. 9.

When the center axes 106 and 107 of the spherical segments 104, 105 are provided offset from each other a controlled flow direction for example for preventing dynamic pressures, a controlled flowing of functional surfaces of other components etc. can be provided in addition to the aperture effect as indicated by the arrow L in FIGS. 7 and 9.

The band plate 101 of the illustrated embodiments can be configured as a band screen and can be arranged directly on the valve bushing 5 of a hydraulic valve 1. Thus, the ends of the band plate 101 can be welded together in a simple manner.

Figure 11:
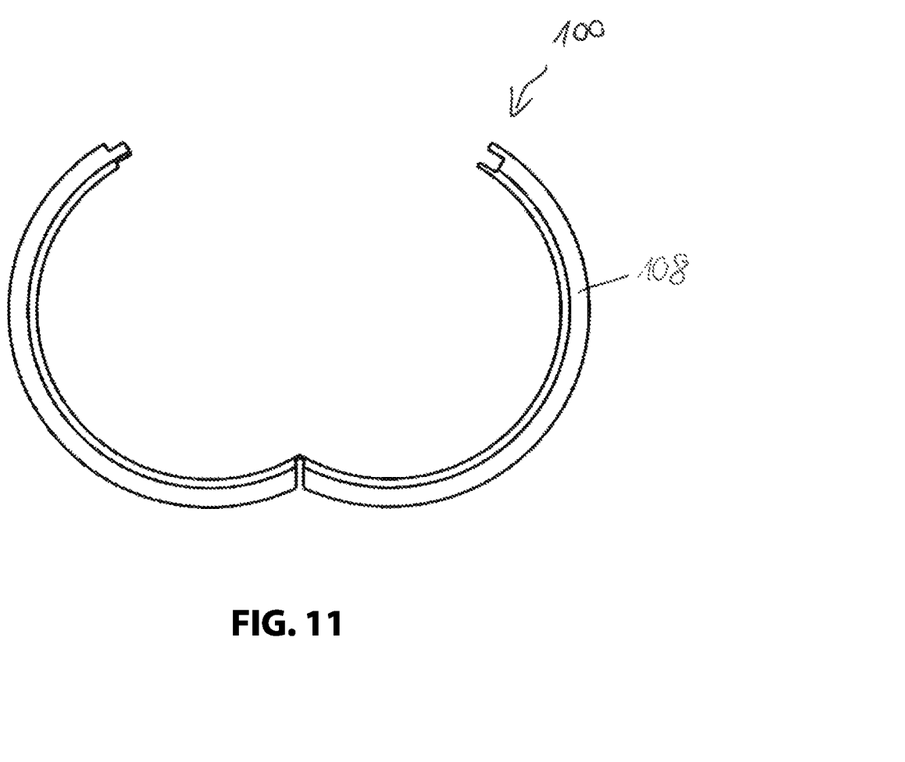
FIG. 11 illustrates a screen according to the invention provided as clip screen.

The band plate can also be integrated in a carrier frame 108 illustrated in FIG. 11 for example through injection molding so that the screen 100 is configured as a clip screen. Thus, the material of the carrier frame 108 can advantageously at least partially engage the spherical segments 104, 105 so that the screen 100 is safely attached in the carrier frame 108.

The application of the screen 100 is not limited to the described transmission valve. Thus, it is also conceivable within the scope of the invention to use the screen 100 according to the invention in a so called cartridge valve for adjusting a cam phaser in order to protect the supply connection P and/or the operating connections A, B against contaminant introduction. Thus, the cartridge valve can be arranged outside of the cam phaser. By the same token the cartridge valve can also be inserted within a rotor hub of the cam phaser. Then this is designated as a central valve.

What is claimed is:

1. A hydraulic valve screen, comprising:
a band plate with etched screen openings,
wherein the etched screen openings are provided in etched non-cylindrical functional contours,
wherein the etched screen openings are configured as substantially circular apertures, and
wherein a cross section geometry and a cross section area of the etched non-cylindrical functional contours varies over a thickness of the band plate.

2. The hydraulic valve screen according to claim 1, wherein the etched screen openings and the etched non-cylindrical functional contours are formed by one sided or two sided etching of the band plate.

3. The screen according to claim 2, wherein the etched screen openings are configured as a contaminant barrier.

4. The screen according to claim 1, wherein the band plate is configured as a band screen.

5. The screen according to claim 1, wherein the band plate is arranged in a carrier frame.

6. A hydraulic valve screen, comprising:
a band plate with etched screen openings,
wherein the etched screen openings are provided in etched non-cylindrical functional contours,
wherein the etched screen openings and the etched non-cylindrical functional contours are formed by one sided or two sided etching of the band plate,
wherein the etched screen openings are configured as substantially circular apertures,
wherein the etched non-cylindrical functional contours are configured spherical segment shaped on one side or on two sides, and
wherein smallest diameters of the etched non-cylindrical functional contours form diameters of the substantially circular apertures.

7. The screen according to claim 6, wherein the etched non-cylindrical functional contours are configured spherical segment shaped on two sides and axial positions of the substantially circular apertures are variable.

8. A hydraulic valve screen, comprising:
a band plate with etched screen openings,
wherein the etched screen openings are provided in etched non-cylindrical functional contours, and
wherein the etched non-cylindrical functional contours are configured on both sides as spherical segments and center axes of the spherical segments are provided offset from each other.

9. A hydraulic valve, comprising:
a hydraulic piston that is supported axially moveable in a valve bushing and that facilitates connecting at least one operating connection with a supply connection or a tank drain, wherein at least one of the operating connection and the supply connection is protected by a screen, wherein the screen is a hydraulic valve screen according to claim 6.

10. A hydraulic valve, comprising:

a hydraulic piston that is supported axially moveable in a valve bushing and that facilitates connecting at least one operating connection with a supply connection or a tank drain, wherein at least one of the operating connection and the supply connection is protected by a screen, wherein the screen is a hydraulic valve screen according to claim 1.

* * * * *